Sept. 14, 1926.

C. B. VAN HORN 1,600,153

BOTTLE MACHINE

Filed Jan. 11, 1921     9 Sheets-Sheet 1

INVENTOR.
BY *C. B. Van Horn*

*Victor J. Evans*
ATTORNEY.

Sept. 14, 1926.

C. B. VAN HORN 1,600,153

BOTTLE MACHINE

Filed Jan. 11, 1921    9 Sheets-Sheet 6

C. B. Van Horn
INVENTOR

BY Victor J. Evans
ATTORNEY

Sept. 14, 1926.

C. B. VAN HORN 1,600,153

BOTTLE MACHINE

Filed Jan. 11, 1921

INVENTOR.
BY C. B. Van Horn

Victor J. Evans
ATTORNEY.

WITNESS:
R. P. Wakefield

Patented Sept. 14, 1926.

1,600,153

UNITED STATES PATENT OFFICE.

CHARLES B. VAN HORN, OF DETROIT, MICHIGAN.

BOTTLE MACHINE.

Application filed January 11, 1921. Serial No. 436,460.

The invention relates to machines for preparing bottles and like containers for filling and the capping thereof and has for an object to provide a machine for the soaking, scrubbing, washing, filling and capping of the bottles or containers.

The invention comprehends among other features the provision of a machine for soaking the bottles, scrubbing the same exteriorly and then washing them interiorly and then filling and capping the cleansed bottles, the operation of soaking, scrubbing, washing, filling and capping being successively carried out in the various sections of the machine, which sections or parts however, operate as a unit in that through certain mechanism the steps incident to the carrying out of the desired object, will be automatically performed throughout the length of the entire machine to the end that the bottles or like containers after being manually or otherwise fed into the soaking and scrubbing section of the machine are carried on through this section into the washing section adapted to the cleaning of the interior of the bottle and then further conveyed or carried on to the filling and capping machine.

I am aware that various forms of bottle soaking, scrubbing and washing machines and also filling and capping machines have been devised heretofore, but in these instances they have been separate units in which the scrubbing and washing may take place in one machine and the filling and capping in another independent machine bearing no operative relation to the soaking and washing machine; in fact being entirely independent thereof and unrelated thereto.

In my invention I aim to provide a single machine which successively carries out the various operations mentioned and in which a single power unit will drive and operate all of the sections and parts at the proper time and in the proper manner to take care of the entire operation to the end that the bottles will be effectively and expeditiously taken care of, requiring less labor and less time and performing the entire operation in a small space.

Still further the invention comprehends a machine of the character mentioned in which a multiplicity of the bottles or containers are treated at one time and at each step as many as eight or more bottles will be simultaneously operated upon to effectively carry out the necessary cleaning operations required to place the bottles in condition to be filled and then carry out the latter and cap the bottles.

In the further disclosure of the invention, reference is to be had to the accompanying drawings, constituting a part of this specification, in which similar characters of reference denote corresponding parts in all the views, and in which,—

Figure 1ᵃ is a side elevation forming a continuation of the structure shown in Figure 1 and comprehending the interior bottle washing section and the capping and filling section.

Fig. 9 is an enlarged detail in side elevation of a cam controlling the operation of parts of my device.

Fig. 10 is an enlarged detail in side elevation of a cam cooperating with the cam shown in Fig. 9 and controlling the operation of parts of my device.

Figures 1, 8:
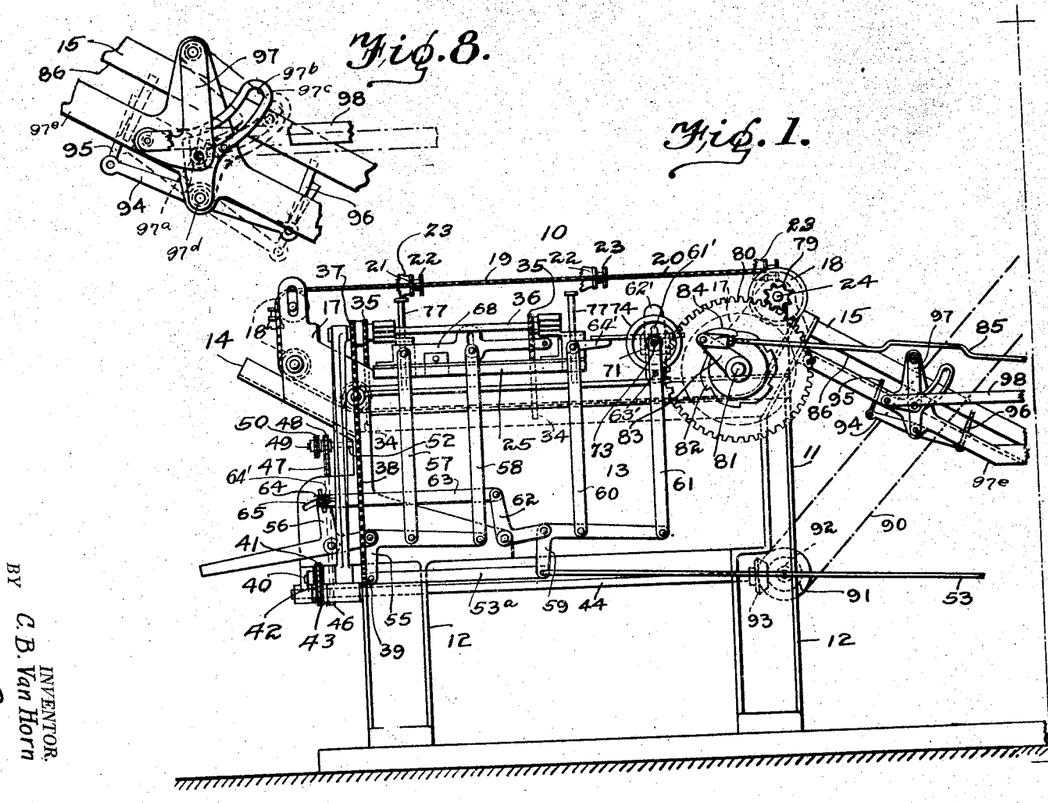
Figure 1 is a side elevation taken through the soaking and exterior scrubbing section.
Fig. 8 is an enlarged detail in side elevation of a bottle stopping mechanism.

Referring to the views, and more particularly to Figures 1, 1ª, 2, 2ª, I disclose a soaker and exterior scrubber section 10, a washer section 10ª and a filler and capper section 10ᵇ, the sections 10, 10ª and 10ᵇ, being mechanically connected by suitable mechanism to bring about a unitary operation of the parts in order that bottles or containers fed into the section 10 at one end thereof, will be carried on through the section 10, operated upon and then carried forward to the section 10ª and operated upon and finally carried on to the section 10ᵇ to be filled and capped and then removed from the entire machine. It will thus be understood that the machine as shown in Figures 1, 1ª, 2, 2ª, is a unitary structure made up of various sections connected together and which are preferably shown in different parts in order that the drawings can be sufficiently clear to understand, and distinguish the detailed mechanism and it should be noted that the machine as shown is adapted to perform the same operation upon a multiplicity of bottles at the same time although for the purpose of clearness I may at times refer to a single bottle in describing its passage through the machine, it being understood however that one or more of the bottles may be subjected to the same action at the same moment.

Figure 2:
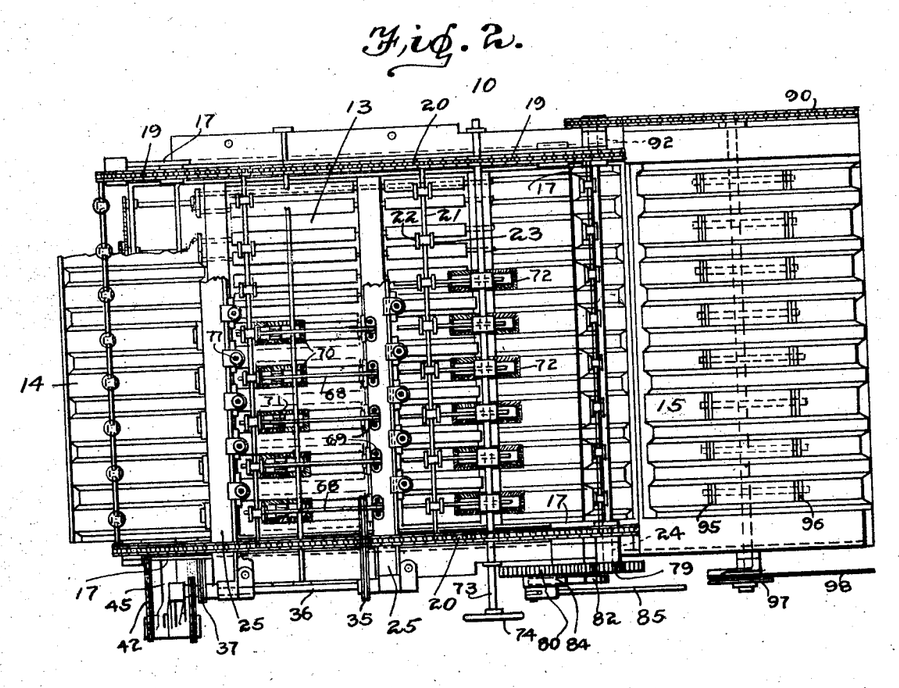
Figure 2 is a plan view of the structure shown in Figure 1.
Figure 3:
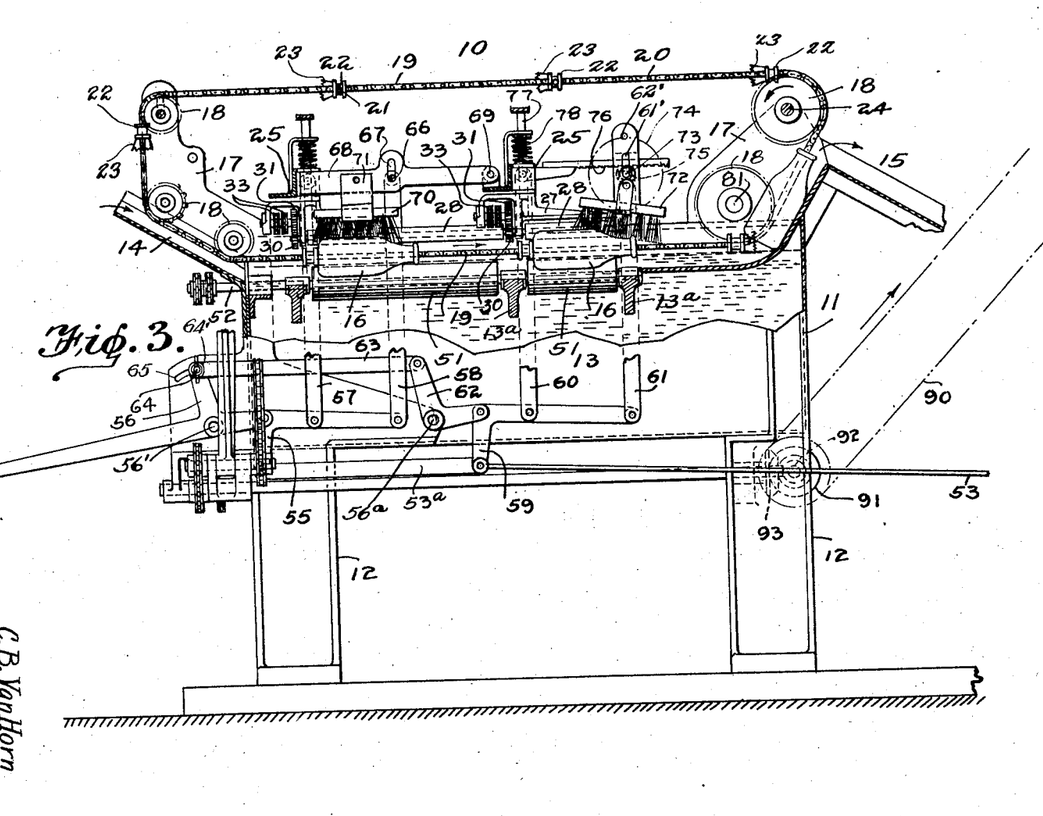
Figure 3 is a fragmentary vertical sectional view taken through the soaker and scrubber shown in Figure 1.
Figure 4:
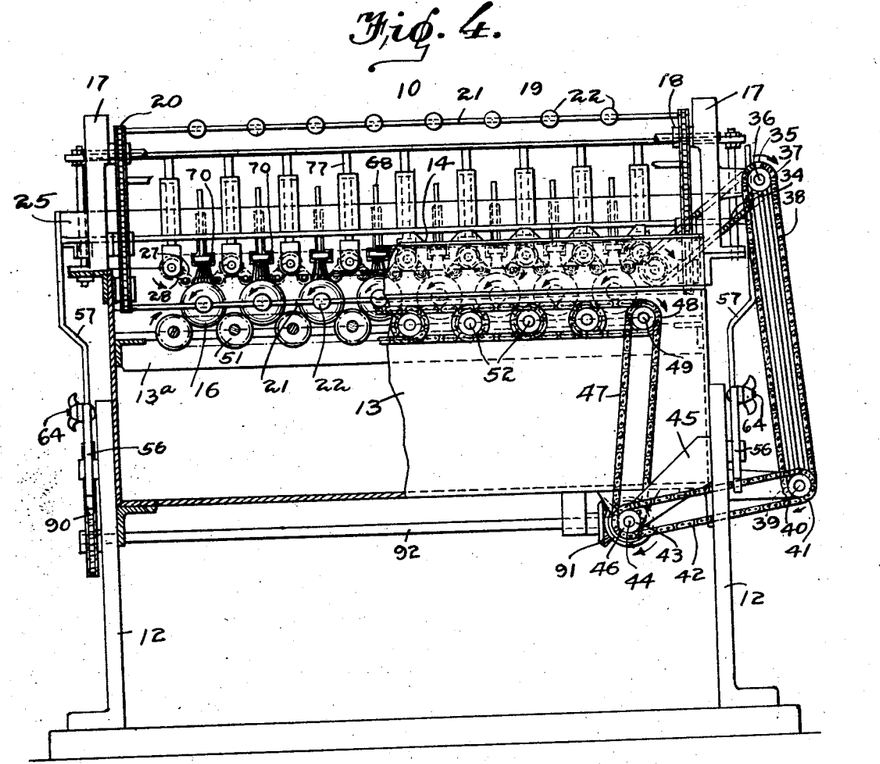
Figure 4 is an end view partially in section of the soaker shown in Figures 1, 2, and 3.

Referring now to Figures 1, 2, 3, the soaker and scrubbing section 10 comprises a suitable frame 11 including supporting legs or uprights 12 and a water or other fluid containing tank 13 having suitable cross pieces 13ª which strengthen the tank and are provided for various other purposes which will be more clearly disclosed hereinafter. The tank 13 is provided at one end (the left hand end) with an ingoing feeding trough 14 and at the other end (the right hand end) with an outgoing feeding trough 15, the troughs 14, 15 being provided for the purpose of guiding bottles or like containers 16 into and from the tank respectively so that the bottles will come in proper contact with the particular mechanisms provided to operate thereon. Journaled on extension brackets or portions 17 of the frame are a series of sprocket wheels 18 for a carrier 19, it being understood that a set of these sprocket wheels are provided on each side of the machine for chains 20 forming a part of the carrier 19 and each including equidistantly spaced cross bars 21 on which are arranged bumpers 22, the latter being in the nature of carrier elements to bump against the bottoms of the bottles as they are fed into the trough 14 and carry them through the tank to the necessary positions desired, enabling the bottles to be operated upon. Each of the bumpers or carrier elements 22 is of a substantially circular construction and at the front end of each there is provided a cushion 23 of rubber or some other suitable material which may be in the nature of a brush to operate upon the bottoms of the bottles due to the rotation of the latter against the cushions 23 as will be readily understood. The carrier is driven by a power shaft 24 which carries one of each set of the sprocket wheels 18 and which when actuated, of course actuates the carrier to bring about the advancement of the bottles into the tank and the subsequent removal of the bottles from the tank.

A series of vertically movable transversely extending roller frames 25 are provided and depending therefrom are brackets 27 on which are journaled upper rollers 28, the latter being carried by suitable shafts 29 which at each end carry a pinion 30 in mesh with a toothed wheel 31 carried on a shaft 32 which also carries a sprocket wheel or wheels 33, the latter being geared up into a single train to be operated by a chain 34 carried on a sprocket wheel 35 on a shaft 36, which shaft 36 carries another sprocket wheel 37 over which operates a continuous chain 38 extending downwardly to operate over a sprocket 39 on a shaft 40, all of these mechanisms constituting a part of the frame or frames 25 which are vertically movable so that the accompanying sprockets and chains will be actuated therewith. The shaft 40 also carries a sprocket wheel 41 over which passes a chain 42, the latter also passing over a sprocket wheel 43 on a shaft 44 journaled on a bracket 45 and the shaft 44 carries a sprocket wheel 46 over which passes a chain 47, the latter passing over a sprocket wheel 48 on a shaft 49 and which in turn is geared up or connected through the medium of a sprocket and chain mechanism 50, to impart rotation to a series of lower rollers 51, the shafts 52 of which are journaled in the cross piece 13ª, of the frame of the tank.

It will now be apparent that when the bottles pass in through the trough 14 by the action of the carrier elements 22, they will be pushed or advanced along in the tank and be immersed in the fluid therein and the bottles will of course be received between the upper rollers 28 and the lower rollers 51 which rollers 28, 51 are by the various chain and sprocket mechanisms described, subjected to rotation, thus bringing about rotation of the bottles and this will immediately result in a cleaning of the bottoms of the bottles by reason of the cushions or brushes 23 on the carrier elements 22.

Aside from the power shaft 24 which is of course connected up in some suitable manner to the main drive shaft as will be hereinafter more fully disclosed, the operation of the soaker as to the scrubbing action thereof upon the bottles, is brought about by the actuating of a main operating rod 53, one of which is arranged on each side of the tank and connects at its right hand end with a bell crank lever 54 of the interior washer of the bottles which will be later described. The other end of the operating rod 53 has pivotal connection with a bell crank lever 59 and with the end of a link 53ª, the other end of which connects to a bell crank lever 55, there being two each of the levers 55 and 59, one arranged on each side of the machine. Each lever 55 has connected to it another bell crank lever 56. The longer arm of the bell crank 55, of which as mentioned heretofore there is one provided on each side of the machine, has a vertical arm 57 and another vertical arm 58 connected thereto and bell crank lever 59 has a vertical rod 60 equivalent to the rod 57 connected thereto with a second vertical rod 61 also connected to the longer arm of the bell crank lever 59. The bell crank lever 59 is in turn connected to another bell crank lever 62 which by a link 63 connects with the bell crank lever 56, the latter receiving therethrough the bolt 64 which is adapted to move within the slot 65 formed in the frame of the machine. This bolt 64 also extends through an opening in the outer end of the arm 63 and a wing nut 64' is mounted upon the outer end of this bolt in order to clamp the lever 56 and arm 63 in adjusted position by forcing the arm in frictional contact with the machine thus retaining the lever and arm against movement after the lever 56 has been actuated to adjust the rods 57, 58, 60 and 61. The vertical rods 57, 60, when the operating arm 53 is actuated, through the medium of the bell crank levers 55, 56, 59, 62, raise the roller frames 25 thus moving the upper rollers 28 upwardly so that the bottles can readily enter between the upper and lower rollers. The adjustable connections between link 63 and lever 56 permits initial setting of the roller frames 25 and the brushes 70 and 72, to be later described, so as to accommodate the particular size or kind of bottles to be cleaned. The adjustment is made by tilting the lever 56 on the fulcrum 56' and by tilting of the bell crank lever 62 on the fulcrum 56ª.

The vertical rods 58, there being one on each side, each has its upper end provided with a cross-piece 66 operating in a slot 67 of a brush arm 68, pivoted at 69 with a brush 70 carried on the brush arm 68 and depending beneath the brush arm and having connection therewith by a part 71. Now it will be seen that operation of the operating rod 53 will through the medium of the bell crank lever 55 for instance, actuate the rod 58 causing the cross piece 66 to operate in the slot 67 thereby providing for the raising or lowering of the brush 70 so that even if the brush becomes worn, it will at all times come in contact with the exterior of the body of the bottle to operate upon the latter and scrub it during the rapid rotation of the bottle, the cross piece 66 and slot engagement 67 thereof thus taking care of the positioning of the brush 70 regardless of the operation of the bell crank lever 55 to actuate the vertical arm or rod 57 actuating the frames 25, it being understood that this particular form of compound mechanism is desirable so that at the moment the bottles are properly accommodated for scrubbing, the scrubbing operation will take place.

A number of brushes 72 are provided, more particularly for scrubbing the necks of the bottles as they are further advanced in the tank after having been subjected to scrubbing action by the brush or brushes 70 and in order that each brush 72 may be properly disposed to operate upon the neck of the bottle, on the exterior thereof, there is provided a cross shaft 73 carrying a hand wheel 74 with the brush suitably mounted with relation to the shaft 73 by means of brush holders mounted loosely on said shaft so that when the latter is rotated a pinion 75 thereon will travel over a rack 76 to move the brushes 72 longitudinally of the bottles so that the particular disposition of each brush 72 to the particular kind and character of neck of the bottle to be scrubbed, can be securely set to effectively operate upon the neck of the bottle, the raising of the brush 72 being accomplished by the vertical rods 60 and 61 which as mentioned heretofore, are connected to the long arm of the bell crank lever 59 so that the rods 60 and 61 are raised by the raising of the long arm of the lever 59 and the raising of each brush 72 is coincident herewith, and in fact also with the operation of the rods 57, 58. The shaft 73 is mounted in the upper ends of the rods 61 and extends through a vertical slot 61' formed in the upper portion of each of the supporting arms 62 which are pivoted at their lower ends, to the body of the frame as at 63'. The rack 76 is secured to an arm 64' which extends from the roller frame 25, as shown in Figure 1 of the drawings. This structure permits adjustment of the shaft in the manner above stated and the shaft, together with the pin 75 is held in adjusted position through the medium of the slotted supporting arms 62', arm 61, and the associated parts respectively. It will be apparent from the foregoing that when the shaft 73 is rotated, the pinions 75 will ride over the rack 76 moving the shaft 73 laterally and adjusting the brushes 72 longitudinally of the bottles and as the brush holders are loosely mounted upon the shaft 73 the brushes will set themselves according to the size and shape of the bottles being washed. It will be understood that there is sufficient friction between the pinion 75 and the rack 76 for maintaining same in an adjusted position. The brackets 27 for the rollers 28 are carried on vertical shafts 77, and springs 78 are provided on the frames thus allowing of a vertical movement of the rollers as to the particular diameters of the bottles received in order that an adjustment of the rollers under the spring tension of the spring 78 relative to the cross frames will be provided, the rollers thus being self adjusting as to the bottles independently of the vertical movement of the cross frame.

The carrier 19 must of course be periodically actuated to advance the bottles in the tank and by reference to Figure 1 it will be seen that the power shaft 24 carries a toothed wheel 79 meshing with a toothed wheel 80 on a shaft 81 which carries one of the sprockets 18 in such a manner that the sprocket 18 will be rotated by the rotation of the shaft 81, a ratchet wheel 82 being also carried on the shaft 81 with a bracket 83 loosely mounted on the shaft. The bracket 83 carries a spring actuated pawl or dog 84 co-operating with the ratchet wheel 82 and an actuating rod 85 has connection with the bracket 83 as shown. Now when a pull is exerted on the rod 85, the dog bearing against one of the teeth of the ratchet wheel 82 will bring about a partial rotation of the ratchet wheel thus rotating the toothed wheel 80 which in turn, meshing with the toothed wheel 79, will rotate the shaft 24, the latter carrying one of the sprockets 18 forming a part of the carrier and thereby imparting movement of the carrier to advance the bumpers or carrier elements so that they in turn will advance the bottles in the tank. This operation is intermittent due to an intermittent pull exerted on the rod 85, the operation of the rod being hereinafter more fully disclosed, and forming a part of the section 10ª.

It will now be seen that in the operation of the soaker and scrubber, which as mentioned heretofore, includes the section 10, a pull exerted on the rod 85 will intermittently actuate the carrier to periodically advance the bottles into the machine, into position to be exteriorly scrubbed on the body thereof, then into position to be scrubbed on the neck thereof and subsequently carried out of the machine through the out-going feeding trough 15 and that through the operation of the operating rod 53 connecting with the bell crank lever 54, the various upper rollers and brushes will be adjusted automatically to bottles of different diameters in order that they will contact therewith and bring about the desired operation of those parts upon the bottles as the bottles pass through the soaking tank, it being understood that when the bottles have passed through the soaker and scrubber, they will have been thoroughly soaked and exteriorly scrubbed and cleaned.

Referring now to Figure 1ª it will be seen that the operating arm 53 is clearly shown in Figure 1ª, as a continuation of the arm as disclosed in Figure 1, and so also with the rod 85, both the arm 53 and its accompanying bell crank lever 54 together with the rod 85, being shown at the left hand end in Figure 1ª. The bottles having been soaked and exteriorly scrubbed, it will be apparent that after they are received in the out-going feeding trough 15, each bottle will subsequently gravitate down the incline 86 to be received in and operated upon by the second section 10ª which I have designated the washer section of my machine and which more particularly may be termed the washer for washing the interior of the bottles. This construction comprehends a frame 87 of any suitable construction and which of course has various portions thereof adapted to constitute bearings and supports for various parts of the shafts and mechanisms to be hereinafter disclosed. This frame 87 carries a shaft 88 which in fact might be called the primary shaft, it receiving the power for the entire machine direct from a suitable source of supply and it will be here noted that the shaft 88 carries a toothed wheel 89 over which passes a chain 90 extending forwardly and downwardly to the soaker illustrated and described in Figures 1 and 3, and said chain passes over a toothed wheel 91 on a shaft 92 which in turn, through the medium of a beveled gear 93, is geared up with the shaft 44 beneath the tank 13 of the soaker, thus supplying the necessary power to bring about the rotation of the rollers of the soaker described heretofore. As the bottle which leaves the out-going feeding trough 15 gravitates down the incline of the trough, it is caught and stopped by a pivoted stop member 94 which includes a plurality of stop elements 95, 96, carried on a centrally pivoted beam 97, the elements 95, 96 being arranged to operate in the trough 15 with the element 95 extended into the path of the trough to stop the bottle in its movement down the incline. At a subsequent time the stop mechanism 94 is operated to reverse the relative positions of the elements 95, 96, thus allowing the bottle to continue its passage down the incline to the stop member or element 96, which later on, when the stop member is again operated, will be moved out of the path of the out-going feeding trough to permit the bottle to further advance into the washer section 10ª. The beam or rock arm 97 carries a roller 97ª which operates in a slot 97ᵇ of a rock arm 97ᶜ. Rock arm 97ᶜ is secured on a stub shaft 97ᵈ to which is also secured the lever 94 so that upon rocking member 97ᶜ, member 94 will also be rocked. Member 97 and shaft 97ᵈ are mounted on a truss or "girt" 97ᵉ which secures the sections 10 and 10ª in definite spaced relationship. The slot 97ᵇ is an off-set or bayonet slot, so that operation of roller 97ª effects movement of arm 97ᶜ to the dotted line position in Figure 8 when arm 97 moves to its dotted line position in that figure. The link or bar provided for the operation of the stop member or mechanism 94 is indicated by the numeral 98 and is shown at the right hand end of Figure 1 and at the left hand end of Figure 1ª, said lever 98 being of an auxiliary nature and connecting directly with the operating lever 85 to be actuated by the latter when it is in turn actuated to operate the carrier of the soaker.

Figure 2A:
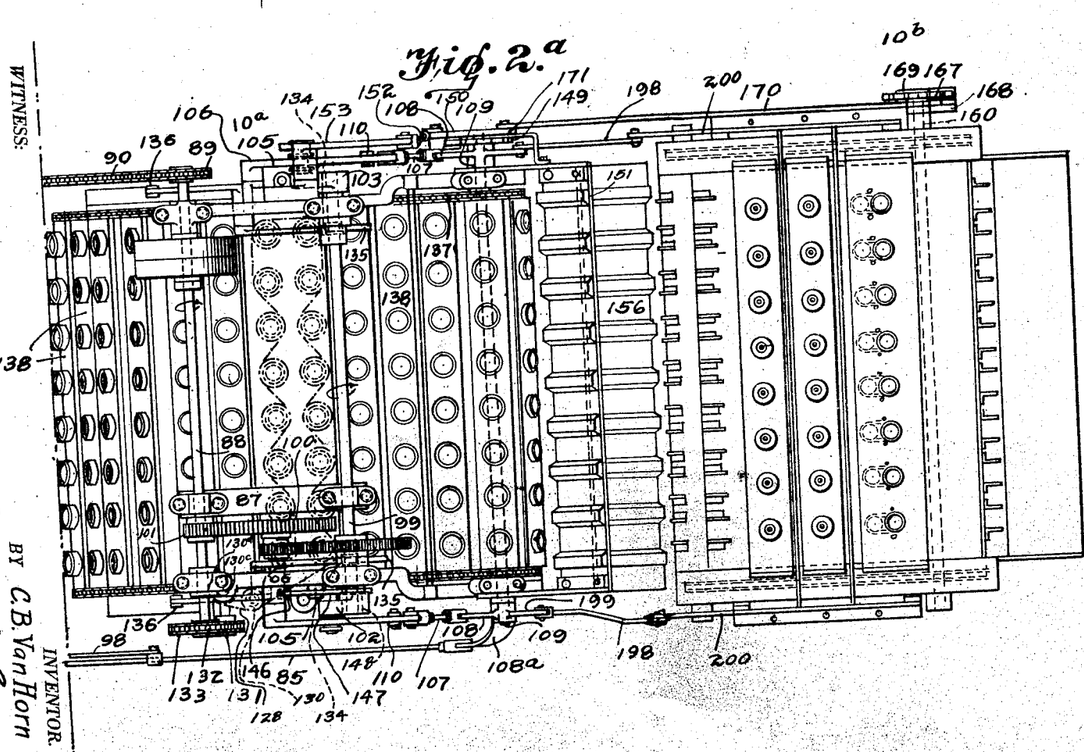
Figures 5, 12, 13:
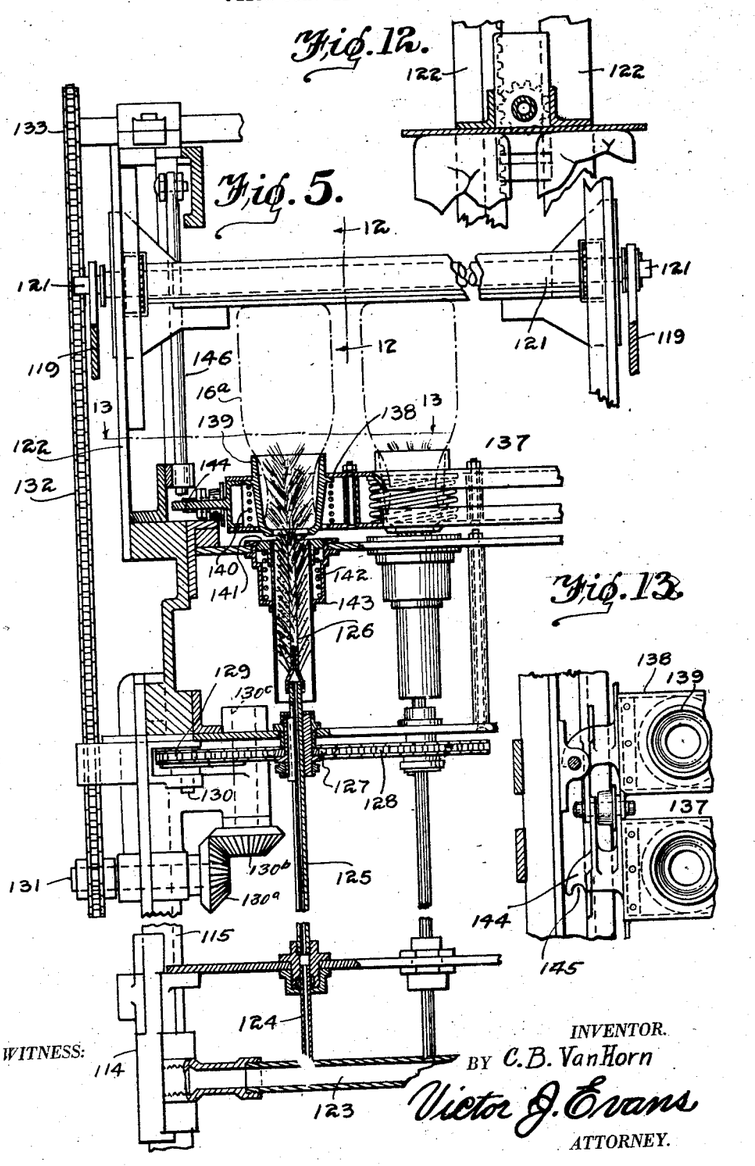
Figure 5 is an enlarged vertical transverse sectional view through the bottle washer section shown in Figures 1ᵃ, 2ᵃ, disclosing the detail of the brush and compensating mechanism.
Fig. 12 is an enlarged fragmentary end view partly in section of a part of the holding mechanism in the interior bottle washing section of my device, the same being taken substantially on line 12—12 of Figure 5.
Fig. 13 is an enlarged top plan view partly in section of a part of the carrier mechanism in the interior washing section, which holds the neck of the bottle during the interior washing operation, the view being taken substantially on line 13—13 of Figure 5.

The frame 87 also carries a shaft 99 which is operated through the medium of a train of gears 100, 101, the latter being carried upon the main or primary shaft 88 to impart rotation to the shaft 99. The shaft 99 carries a crank arm 102 on one end and a similar crank arm 103 on the other end, each being provided with a roller 104 operating on a cam 105, the latter being pivoted at 106. The free end of the cam 105 has pivotal connection with a rod 107 which connects with one end of a bell crank lever 108 loosely mounted on a shaft 109, on the frame 87 and the other end of the bell crank lever 108, indicated by the numeral 108ª has connection with the operating rod 85 which has been described heretofore, as the connecting means for bringing about intermittent operation of the carrier of the soaker and also operation of the stop mechanism in the out-going feeding trough, it being understood that the operation of the rod 85 is in the nature of a pull exerted by the downward action of the rod 107 which of course later on will be reversed in its action. It will be noted that the free end of the cam also carries a downwardly extending rod 110 which at its lower end connects with a combined brush and bottle compensating mechanism 111, consisting of a link 112 to the upper end of which the rod 110 connects, the lower end of said link having pivotal connection with another link 113 which in turn is connected to a block 114 adapted to operate vertically in guides 115. The link 112 has connection with an upwardly extending link or bar 116 having a projection 117 operating in a slot 118 formed in the frame 87. The upper end of the rod 116 connects with a link 119 which has one end thereof in pivotal connection with a link 120 journaled on the frame of the machine, the other end of the link 119 connecting with a cross head 121 adapted to move vertically in guides 122, this cross head forming a part of the bottle compensating mechanism 111. Now it will be apparent that when a bottle is in inverted position in the washer and is ready to be operated upon by the brush, which will be hereinafter mentioned in detail, it is necessary that the bottle be secured in position for washing and it is for this reason that the compensating mechanism is provided, the latter insuring the proper positioning of the bottle regardless of its length. With this in view, it will be apparent that the downward push on the lever 110 will because of the provision of the projection 117 in the slot 118 of the lever 116, impart a downward movement to the lever 116 and thus because of the links 119, 120, carry down the cross head 121 against the bottom of the inverted bottle. At the moment the cross head strikes the bottom of the inverted bottle the fulcrum of the link 112 will be changed to the point where the link connects with the lever 116 and thus a further downward movement of the rod 110 will result in an upward swinging movement of the lower end of the link 112 thus carrying the block 114 upwardly. The block 114 has connected thereto a suitable water supply 123 which has a branch pipe or pipes 124, shown in detail in Figure 5, said pipe connecting in any suitable manner with a tubular rotatable brush holder 125 and its accompanying brush 126, the holder and brush being movable upwardly with the block 114 to bring the brush up into the bottle which is in position to be cleaned interiorly and which for the sake of convenience and clearness is shown in Figure 5 and indicated by the numeral 16ª. The rotation of the brush holder and its accompanying brush is accomplished through the medium of a toothed wheel 127 carried on the holder and operated by a chain 128 passing over a toothed idler wheel 129 on a stud shaft 130 suitably connected to a shaft 131, which in turn is operated by a chain connection 132 connecting with the primary shaft 88 by a toothed wheel 133. The connection from shaft 131 to shaft 130 is best shown in Figures 5 and 2ª, and consists of a miter gear 130ª keyed or otherwise secured to the inner end of shaft 131 and meshing with a similar gear 130ᵇ keyed or otherwise secured to a stub shaft 130ᶜ to which is secured a sprocket or toothed wheel 130ᵈ meshing with chain 128. Thus it will be apparent that the brush holder and its accompanying brush are constantly rotated and of course when the brush is advanced upwardly into the interior of the bottle, secured in position to be washed, said bottle will be subjected to the rotary action of the brush and the cleaning operation is facilitated by the stream of water from the supply 123 passing upwardly through the pipe 124 and thence on through the brush holder 125 and the tubular brush 126.

In the train of gears 100, 101, there is provided a gear which may be particularly designated by the numeral 101$^a$ and this gear carries a roller 134 adapted to engage and operate upon one end of a substantially centrally pivoted beam 135, the other end of which has connected thereto the upper end of a vertically disposed rod 136 which latter extends downwardly and connects with the bell crank lever 54. It will be remembered that the bell crank lever 54 is the interposed connection between the operating arm 53 and the section 10$^a$, namely the interior washer, whereby operation of the arm 53 is obtained to bring about operation and adjustment of the upper rollers and brushes of the soaker and it will of course be clear that at each revolution of the toothed wheel 101$^a$ the roller 134 will be brought into contact with the beam 135 to actuate the rod 136 and thus impart operation to the operating arm 53 and its co-operating mechanism heretofore described.

Figures 1A, 9, 10:
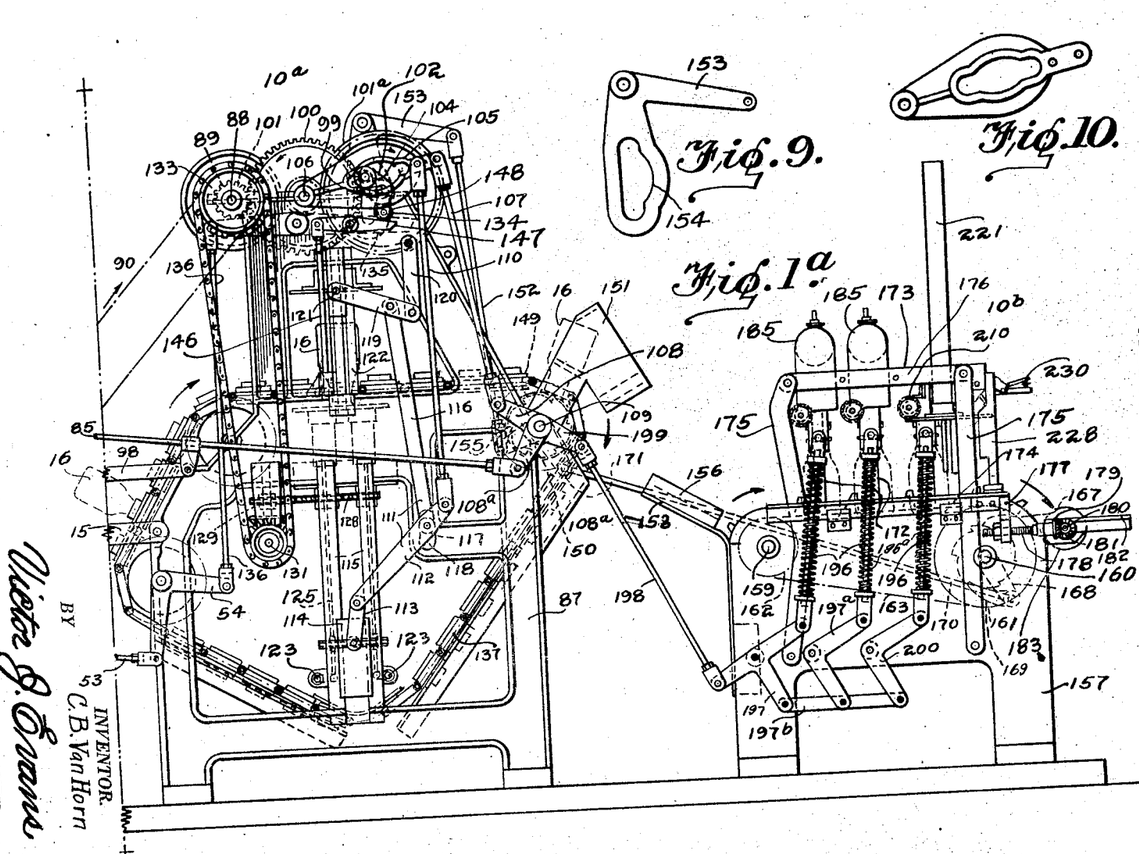

By reference now, to Figure 1$^a$, it will be seen that the frame 87 supports a continuous bottle carrier 137 which is adapted in its intermittent operation to receive and remove from the feeding trough 15 each bottle as the latter is permitted to descend in the trough to the section 10$^a$ and of course the intermittent operation of the carrier will bring the bottle to the point where it is operated upon as shown in Figure 5 and at which point the cross head 121 descends to fix the bottle and the brush 126 ascends to operate upon the interior of the bottle. The carrier may be of any desired construction but is preferably made up of a series of connected carrier elements 138, each of which is adapted to receive the neck of a bottle, the carrier elements being shown in detail in Figures 5 and 13. Now referring once more to Figure 5, it will be seen that each carrier element 138 includes a cup shaped portion 139 which is normally held up by a spring 140 and which by the action of the head of the bottle in the portion 139 may be depressed against the action of the spring 140 and thus strike and actuate a vertically slidable plate 141 also normally held up by a spring 142 in a casing 143, this construction being provided to further compensate for bottles of different lengths in order to secure a proper disposition of the bottle at the time when it is operated upon by the interior brush. It will be apparent that when the carrier 137 is actuated it is necessary to bring about an intermittent movement in order that the bottles at the proper moment of time will be brought into and out of washing position and therefore each carrier element 138 is provided with an extension 144 having a notched-outportion 145, the latter receiving the lower end of a vertical stop or rod 146, the upper end of which is connected to one end of a beam 147, pivoted on the frame 87, the other free end of the beam 147 being adapted to be periodically engaged by a roller 148 carried on an extension of the crank arm 102 which carries the roller 104 operating over the cam 105. Thus the stop or rod 146 will be periodically raised and lowered and when lowered will strike one of the extensions 144 of one of the carrier elements 138, thus stopping the carrier and its elements at a pre-determined period and at which time a bottle is received in position for washing.

The shaft 109 carries a ratchet 149 and loosely mounted upon the shaft is an arm 150 formed on or secured to one end of a bucket 151, said arm 150 connecting with the lower end of a rod 152 which extends upwardly to connect with an arm of a cam lever 153, the latter being pivoted on the frame 87 and having its cam portion 154 adapted to be operated upon by the roller 104 on the crank arm on the shaft 99. The arm 150 also carries a spring actuated pawl or dog 155 adapted to operate upon the ratchet 149 so that when an upward pull is exerted on the rod 152 the ratchet 149, through the co-operation of the pawl 155, will be rotated, and having connection with the carrier 137, will intermittently actuate the latter thus removing a bottle or section of bottles that has been interiorly washed and advancing in place thereof a new bottle or section of bottles to be washed. This same action of the arm 150 through the medium of the rod 152 and the cam lever 153, actuates the bucket 151, the latter being disposed adjacent one end of the carrier 137 to receive one of the bottles and by its downward movement depositing said bottle in a trough or chute 156 which in fact forms a part of the section 10$^b$, known as the filler and capper section.

The filler and capper section comprises a frame 157 from which the trough 156 extends at an angle to be met by the bucket 151 when the latter is swung downwardly thereby insuring the gravitation of the bottle in the bucket into the chute 156. The frame 157 has journaled thereon a plurality of cross shafts 159, 160, which carry toothed wheels 162, 161, respectively, the said toothed wheels being connected by a chain 163 which forms a part of a continuous carrier 164, including a series of equidistantly spaced bottle carrier elements 165. The carrier 164 traverses the chute 156 so that when the bottle is lying in the chute and the carrier is in intermittent operation, one of the carrier elements 165, traversing the chute in its movement, will pick up the bottle in the chute and advance it into a vertical position, sliding the bottle from the base or bottom 158 of the chute so that the bottom of the bottle will repose upon and be slid along a table 166 carried by the frame 157. The shaft 160 carries a ratchet wheel 167 and loosely mounted on the shaft is an arm 168 carrying a spring actuated dog or pawl 169 adapted to co-operate with the ratchet wheel 167 to intermittently actuate the carrier 164. The lower end of a rod 170 is connected to the arm 168 and extends upwardly to connect with an arm 171 which is carried on the shaft 109, said arm 171 being either integrally formed with the arm 150, or keyed or riveted thereto, so that operation of the rod 152 in the manner described heretofore, will actuate the rod 170, thus bringing about rotation of the shaft 160 and intermittently operating the carrier.

Figure 6:
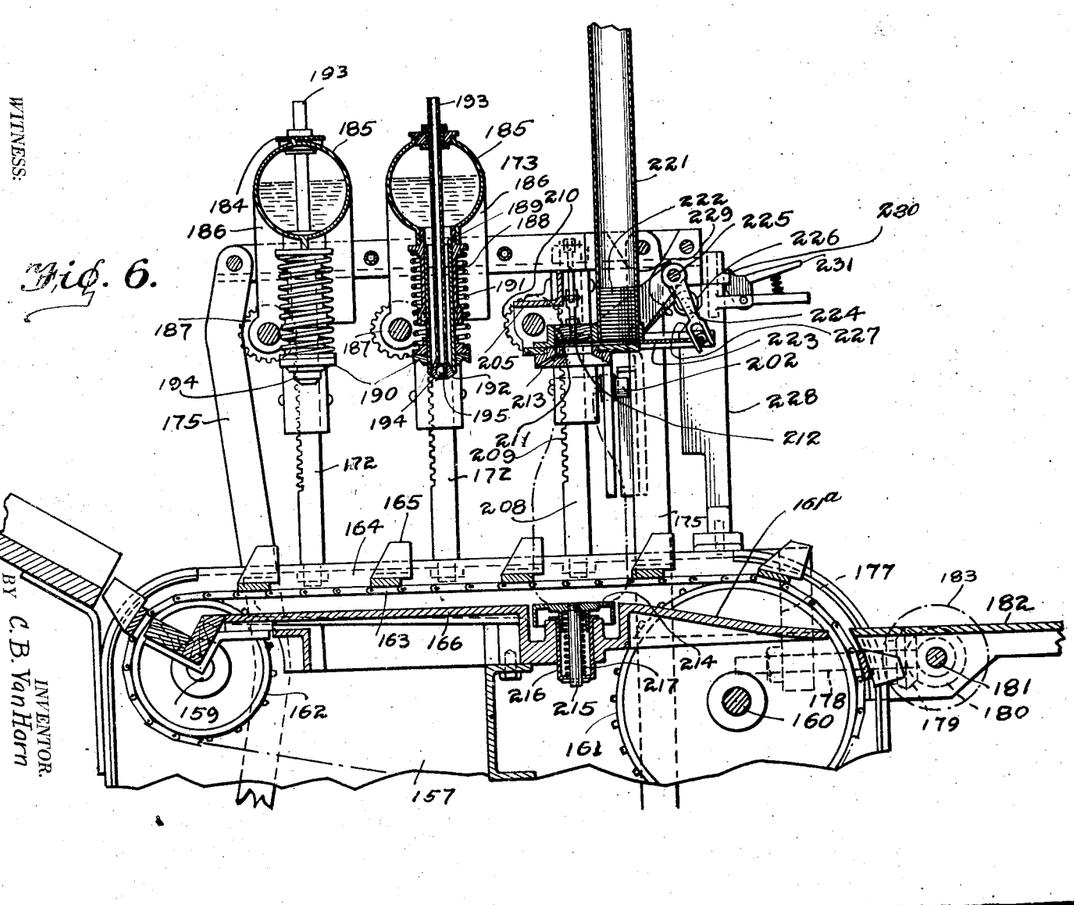
Figure 6 is an enlarged vertical longitudinal sectional view taken through the capper and filler shown in Figures 1ᵃ, 2ᵃ, and disclosing a detail arrangement of the parts.

A plurality of uprights 172 are suitably anchored in a movable sub-frame 173 mounted to slide horizontally on suitable guides 174, said uprights being in the nature of racks, as shown in Figure 6. The sub-frame 173 includes swinging uprights 175 and cross pieces 176 and by reference to Figure 1ª it will be seen that the sub-frame can be swung horizontally on the frame 157 by having a depending threaded plate 177 engaged by a screw rod 178 suitably mounted on the frame 157 and carrying a gear 179 meshing with a gear 180 on a horizontal shaft 181, the latter being suitably journaled beneath a table 182 with a suitable hand wheel or lever 183 provided for turning the shaft 181, thus as will be readily seen bringing about a horizontal movement of the sub-frame 174 relative to the frame 157. This construction is provided in order that the bottles will be properly centered beneath the filling and capping mechanism, it being readily understood that bottles of different diameters naturally would have to be differently disposed or adjusted beneath the filling and capping mechanisms in order to properly center the bottles relative thereto. Each of the uprights 172 has movably mounted thereon a filler 184. Each filler comprehends a container 185 supported on a frame 186 which latter also carries a toothed wheel 187 meshing with the rack of the upright 172 to facilitate the guiding of the frame 186 vertically upon the rack or upright. The filler, beneath the container 184 includes an outer sleeve 188 and an inner sliding sleeve 189, the lower end of the latter being provided with a bottle-engaging portion 190, an expansible helical spring 191 normally closing the lower part of a valve 192 which is opened by the upward movement of the inner sleeve 189 when the portion 190 engages the top of the bottle in the downward movement of the filler, thus allowing the liquid in the container 185 to pass out through the resulting opening and thus flow from the inner sleeve into the bottle. An air tube 193 has its upper end projecting upwardly beyond the container and this tube projects downwardly through the inner sleeve and terminates in a head 194 having a ball valve 195 therein, this head 194 being received within the neck of the bottle during the filling operation so that when the bottle becomes filled with liquid the ball valve 195 will, by the action of the liquid, float and thus close the lower end of the tube 193 thereby shutting off the outlet of air from the bottle which is now filled. Of course it will be understood that when the filler is retracted and moves upwardly the expansion of the spring 191 will return the inner sleeve 189 to its normal position causing it to engage the head 194 and thus close the lower exit of the liquid from the inner sleeve. It will of course be understood that I preferably provide a plurality of the filling devices and that each bottle in the movement of the carrier, will be brought beneath the first filling device and subsequently beneath the second, this arrangement being provided to insure complete filling of the bottle in that if the bottle is not filled completely by the action of the first filler it will, when subsequently subjected to the action of the second filler, be properly filled with the desired liquid. Each of the fillers 184, as mentioned heretofore is vertically movable upon each upright 172 and in order to accomplish this vertical movement, I provide for each filler a rod 196 which has pivotal connection at its upper end with the filler and its lower end connects with an arm of the bell crank lever 197, the latter being suitably pivoted on the frame 157 and having another arm thereof connecting with a rod 198 which latter rod in turn connects with a crank arm 199 carried on the shaft 109, the crank arm 199 being movable with the arms 108, 108ª, of which the arm 108 has connection with the rod 107, the operation of which has been mentioned heretofore. Springs 196ª surround rods 196 so as to make a resilient connection between the rock levers and the fillers to compensate for differences in heights of bottles. Thus when the rod 107 is actuated to actuate the operating rod 85, the rod 198 will be simultaneously operated to actuate the bell crank lever or levers 197, a bell crank lever 197ª of an auxiliary nature being also provided and pivoted on the frame 157 to connect with a link 197ᵇ having connection with an arm of the lever 197, said bell crank lever 197ª insuring operation of the second filler.

It will now be seen that the carrier for the filler and capper is intermittently operated to bring the bottle successively beneath a plurality of the fillers, which latter through the medium of the sub-frame 174 can be moved horizontally in order to adjust them in the vertical line of the bottle, the fillers being also movable vertically to come down upon the bottle and at that moment automatically bring about the filling of the latter.

Figure 7:
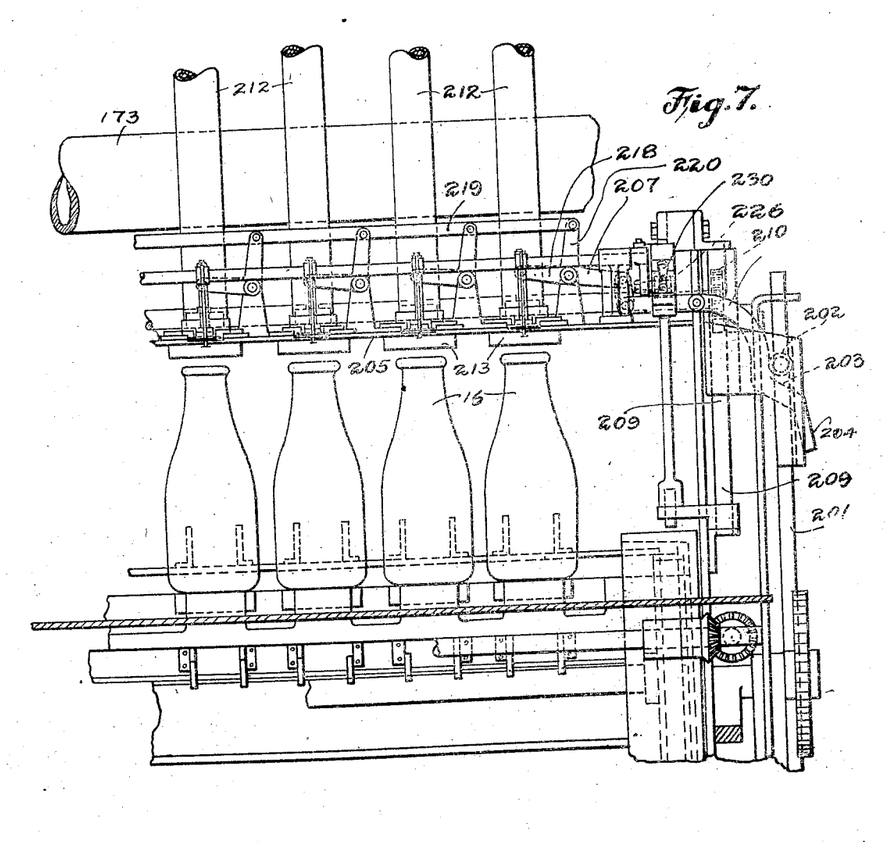
Figure 7 is another enlarged view of the structure shown in Figure 6, looking transversely thereof.
Figure 11:
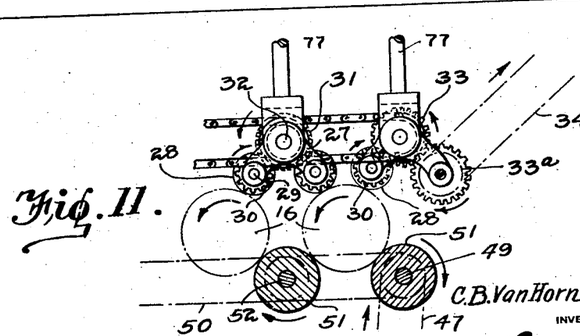
Fig. 11 is an enlarged detail in end elevation partly in section of bottle turning rollers and mechanism in the soaker section of my device.

By reference now to Figures 1ª, 6, 7, it will be seen that the link 197ᵇ has an end thereof connected to a bell crank lever 200 pivoted on the frame 157 with an arm of the bell crank lever connecting with a rod 196 which may be spring actuated as shown and is connected to the capping apparatus, to be later described, for raising and lowering the same in the same manner as the filling apparatuses are raised and lowered; a fixed rod 201 extends up along the frame of the machine and carries a roller 202, the latter being adapted to operate upon an inclined face 203 of a curved operating lever 204 pivoted on the cross head 205 and connected by a link 206 with one end of a bell crank lever 207 pivoted on the frame of the machine. The cross head 205 comprehends a capping mechanism for capping the bottles after they are filled and the cross head is adapted to slide vertically on an upright 208 similar to the uprights 172 and including a rack 209 over which is adapted to operate a toothed wheel 210 carried on the cross head. The cross head carries a vertically movable plunger 211, the lower end of which is provided with a driver 212 suitably guided in a centering head 213, the lower end of which is flared to properly center the top of the bottle relative to the driver. Now referring to Figure 6, it will be seen that when a bottle is brought into position beneath the capper it will repose upon a vertically movable platform 214 which is carried on a plunger or rod 215 mounted in a casing 216, the platform 214 being normally supported by an expansible helical spring 217 which of course will compress when the capping operation is about to take place in order that the mechanism will be able to take care of bottles of different lengths, the cross head being adapted to be moved downwardly until it strikes the top of the bottle, regardless of the height of the latter. Thus it will be seen that when the capping apparatus is pulled downwardly the cross head will be also moved downwardly and so also the lever 204. At the moment the centering head 213 engages the top of the bottle to firmly center and secure the bottle between the centering head and the table 214 the continued downward movement of the capping apparatus will cause the roller 202 to operate over the inclined face 203 thus actuating the rod or lever 204, and in turn actuating the T-shaped lever 207 which latter has an arm 218 thereof connected to the plunger 211. By reference to Figure 7 it will of course be seen that a cross arm 219 connects with an extension 220 of the lever 207 in order to actuate the various other plungers 212 (Figure 7) on the machine, all of these plungers being identical in form and operation. A hopper 221 is carried by a cross head and is adapted to be filled with caps 222 which in this instance are in the nature of wafers or disks. A horizontal pusher 223 is arranged to move across the lower end of the hopper and bears against the lowermost cap, pushes the same out of the hopper into position in the centering head 213 and immediately beneath the drives 212 which latter when actuated will force the positioned cap downwardly into the mouth of the bottle, the cap being thus of course seated in the bottle to firmly seal the latter. The pusher 223 is actuated by a bifurcated arm 224 which is suitably mounted to swing on a shaft 225 and has its bifurcated end in sliding engagement with the pusher and the arm 224 is provided with a roller 226 adapted on its downward movement to ride upon an inclined face 227 of a pivotally supported sub-frame 228, the return movement of the roller 226 being guided by an inclined face 229. It will now be seen that as the cross head is moved downwardly, the roller 226 will ride down the inclined face 227 thus actuating the arm 224 to in turn actuate the pusher 223 and remove a single cap from the hopper to the centering head. The sub-frame 228 having the inclined face 227 thereon, is pivoted to swing horizontally and is normally locked by a dog 230 which by reason of a lever actuated by a spring 231 can be unlocked, permitting the sub-frame 228 to be swung out of the path of the roller 226, this being desired in instances where in the operation of the machine, a bottle is not received in position for capping. It will be apparent, that if in the operation of the machine a means were not provided to control the feeding of the caps to the centering head, the operation of the mechanism would result in a cap being fed each time the mechanism is actuated. By the provision of the sub-frame 228, the capping and feeding mechanism can be thrown out of operation so that no caps will be advanced into capping position except when there is a bottle received beneath the capper to receive a cap.

After the bottle has been capped the various mechanisms described for working the intermittent operation of the carrier 164 will function to advance the carrier and thus remove the filled and capped bottle from the table 214 on to a downwardly inclined table portion 161ª of the table 166 so that after the particular carrier element 165 has passed on and left the filled and capped bottle on the table portion 161ª, the said bottle can be readily removed manually on to the table 182 and thence dispatched in any suitable manner to the proper boxes or places of storage or delivery.

Having now described the individual mechanisms and operations of the various sections 10, 10ª and 10ᵇ, embodying the soaker and exterior scrubber section, the interior washer section and the filler and capper section, it will be apparent that the operation of each and all of the sections, is a co-incident one, in that while bottles are being received in and carried through the section 10 to be soaked and exteriorly washed, others of the bottles previously subjected to the operation of the soaker, will be advancing through the interior washer to be acted upon by its various operating parts to thoroughly clean the interior of the bottle, and likewise other of the bottles previously subjected to the action of the soaker and the interior washer will now be in the process of filling and capping. In this manner a continuous operation is afforded and from the time an empty bottle is carried into the soaker, to the time when it is delivered to the table 182 the bottle will be successively subjected to a soaking and exterior cleaning, an interior scrubbing action and ultimately a filling and capping operation.

As mentioned heretofore, I am aware that various machines have been devised heretofore for soaking and scrubbing bottles and for filling and capping bottles but in all of these instances the soaker is one form of machine and the filler and capper is an entirely independent mechanism not in any manner related to the soaking and washing machinery. It is by the novel arrangement and construction of my form of bottle washing, filling and capping machine that I am able to soak and exteriorly wash, interiorly clean and fill and cap one or a multiplicity of bottles with one machine, which as described herein, has merely been divided into sections in order that the construction of the machine and the relative arrangement of the various parts could be clearly set up but it must be understood that the machine operates as a unit in which, while one or more bottles are being operated upon by one part of the machine, one or more bottles in other parts of the machine are being simultaneously operated upon in order that the ultimate result of filling and capping can be attained in connection with a bottle that has been previously prepared for this operation by and within the same mechanism.

In order that the above may be more fully understood in conjunction with the description and operation of the various sections 10, 10ª and 10ᵇ, described heretofore, it may be well to reiterate that the shaft 88 which I have termed the primary shaft, is in fact the prime mover on which the operation of the entire machine depends, this shaft being connected up with any suitable source of motor power which may or may not be an electric motor and which may be connected with the shaft in any suitable manner. Referring back to the detailed description of the soaker comprehended in the section 10, it will be clear that the moment the shaft 88 is placed in operation, the chain and sprocket connection between the shaft and the soaker brings about operation of mechanism in the latter which insures operation of the rollers tending to impart to the bottles the necessary rotation, whereas the operating rod 53 also ultimately deriving its operation from the primary shaft, through the medium of the described beam and roller, brings about the operation of the brushes on the exterior of the bottles. Likewise the operation of the rod 85 insures intermittent action of the carrier of the soaker and also through suitable mechanism described, controls the advancement of a bottle or bottles from the soaker to the carrier of the interior washer. This carrier 137 is of course also intermittently operated to bring the bottles into position to be interiorly scrubbed and washed and subsequently advanced in the machine to the next operation and therefore through the medium of the cams 105, 153, the intermittent operation of the carrier 137 and the operation of the compensating mechanism allowing for different sized bottles together with the action of the interior brush, is brought about so that when the bottle is subsequently delivered to the bucket of the interior washer it will have been cleaned exteriorly and interiorly and be ready for the filling and capping operation. Here the bottle must also be carried intermittently through the section 10ª and the carrier thereof, indicated by the numeral 164 is in turn intermittently operated through the medium of the rod 170 and the cam 153 which through the mechanism described, actuates the rod at the proper time. So also the filling and capping mechanisms are in turn operated synchronously with the operation of the carrier and through the medium of the rod 198 and the cam 105, bring about the desired action whereby the bottle filled and properly capped is ultimately delivered to the table 182 from which it can be manually or otherwise removed for packing or storage, as the case may be.

It will of course be understood that in a machine of this character it is preferable to subject a multiplicity of bottles to the same action at the same instant, and although at times I have referred to a single bottle and at other times to a multiplicity of bottles it will be clear that whether the machine operates on a single bottle or a number of bottles, the duplication of the mechanism in the latter instance is substantially the same. Therefore it will be apparent that in instances where I have mentioned only one or a certain part of a mechanism, two or more may be employed, the machine described comprehending in its operation the thorough cleaning of a bottle or bottles and the subsequent filling and capping thereof in a step by step manner in which one part or section of one machine may and in fact must depend on another part or section of the same machine in order that the desired object will be fulfilled.

It will of course be understood that I do not limit myself to the particular construction and details of arrangement set forth herein; that various slight changes may be made in the construction, arrangement and adjustment of relative parts, without departing from the object of the invention, namely the soaking, washing, filling and capping of bottles and that with this object in view the scope of the invention is set forth and defined by the appended claims.

Having described my invention, I claim,—

1. A machine comprising interconnected sections, one a soaker and exterior bottle scrubber and the other an interior bottle washer, a carrier for the soaker and scrubber section to advance the bottles therethrough, a carrier for the interior washer section to advance the bottles therethrough, an operating shaft, means on the second mentioned section and operable by said operating shaft and connecting with the carrier of the first mentioned section to operate the same and means on the second section and operable by said operating shaft and connecting with the carrier of the second said section to operate same.

2. In a bottle washing and filling and capping machine the combination with inter-connected washing sections and a capping and filling section connected to the former, of a shaft, means for operating said shaft, cam mechanism operable by said shaft, and means operable by said shaft, and controllable by said cam mechanism for concomitantly operating mechanism in all of said sections.

3. In a bottle washing and filling and capping machine the combination with inter-connected washing sections and a capping and filling section connected to the former, each including a respective carrier, of a shaft, cam mechanism operable by said shaft, and a connection from each of said carriers to said cam mechanism and operable thereby.

4. In a bottle washing and filling and capping machine the combination with inter-connected washing sections and a capping and filling section connected to the former, of a shaft, cam mechanism operable thereby, and a respective connection for each of said sections and operable by said cam mechanism.

5. In a bottle washing and scrubbing and filling and capping machine the combination with bottle washing and scrubbing sections a filling and capping section of movable continuous carriers for said sections, a shaft, cams operable by said shaft, connections operable by one of said cams for effecting operation of the carrier of one section and the function performing mechanism of a plurality of other sections, and connections operable by another of said cams for effecting operation of the carriers of said plurality of other sections.

6. In a device of the class described, the combination of a plurality of machine sections each including a respective bottle carrier, and each including means for performing a respective function with relation to a bottle, an operating shaft for all of said sections, a pair of cams operable from said shaft, means operable from one of said cams to operate the carrier of one of said sections and the function performing means of another of said sections, and means operable by the other of said cams for operating the carrier of said other of said sections in timed relation to the operation of the function performing means by the first said cam.

7. In a device of the class described, the combination of a plurality of machine sections each including a rotary bottle carrier and a ratchet-and-pawl drive therefor, a driving shaft, cam mechanism operable by said shaft, and a respective link for each of said ratchet-and-pawl elements and operable by said cam mechanism for operating said bottle carriers in timed relationship.

8. In a device of the class described, the combination of a plurality of machine sections forming a plurality of bottle operating stations, whereat the bottles may be scrubbed, washed, filled, and capped, a plurality of bottle carriers for moving bottles from one to another of said stations in timed relationship, an operating shaft for effecting operation of said sections at each of said stations, cam mechanism operable by said shaft, and a plurality of links operable by said cam mechanism and connected to the respective bottle carriers for effecting operation thereof.

9. A machine of the class described comprising a plurality of primary rollers, means for feeding bottles along said rollers, secondary rollers for maintaining bottles in contact with the first said rollers, and means for operating on said bottles.

In testimony whereof I affix my signature.

CHARLES B. VAN HORN.